A. MOSER.
LEVELING DEVICE.
APPLICATION FILED MAR. 8, 1916.

1,220,261. Patented Mar. 27, 1917.

Inventor:
Andrew Moser
Attorneys.

UNITED STATES PATENT OFFICE.

ANDREW MOSER, OF HICKMAN, NEBRASKA.

LEVELING DEVICE.

1,220,261.  Specification of Letters Patent.  Patented Mar. 27, 1917.

Application filed March 8, 1916. Serial No. 82,982.

*To all whom it may concern:*

Be it known that I, ANDREW MOSER, a citizen of the United States, residing at Hickman, in the county of Lancaster and State of Nebraska, have invented new and useful Improvements in Leveling Devices, of which the following is a specification.

This invention relates to a leveling device for an apparatus of any kind, mounted on wheels that run upon the ground, and has for its object to provide a simple and efficient means for rapidly adjusting such wheeled apparatus to a true level, both longitudinally and transversely, when brought to rest on uneven ground.

In the accompanying drawings—

Figure 1:
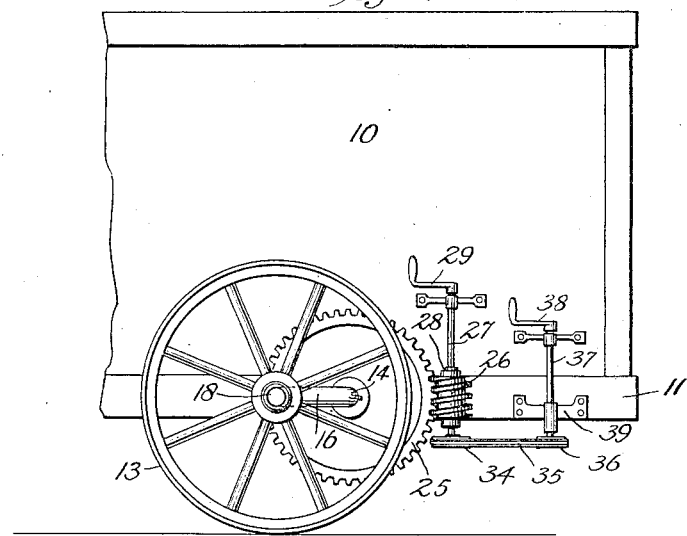
Figure 2:
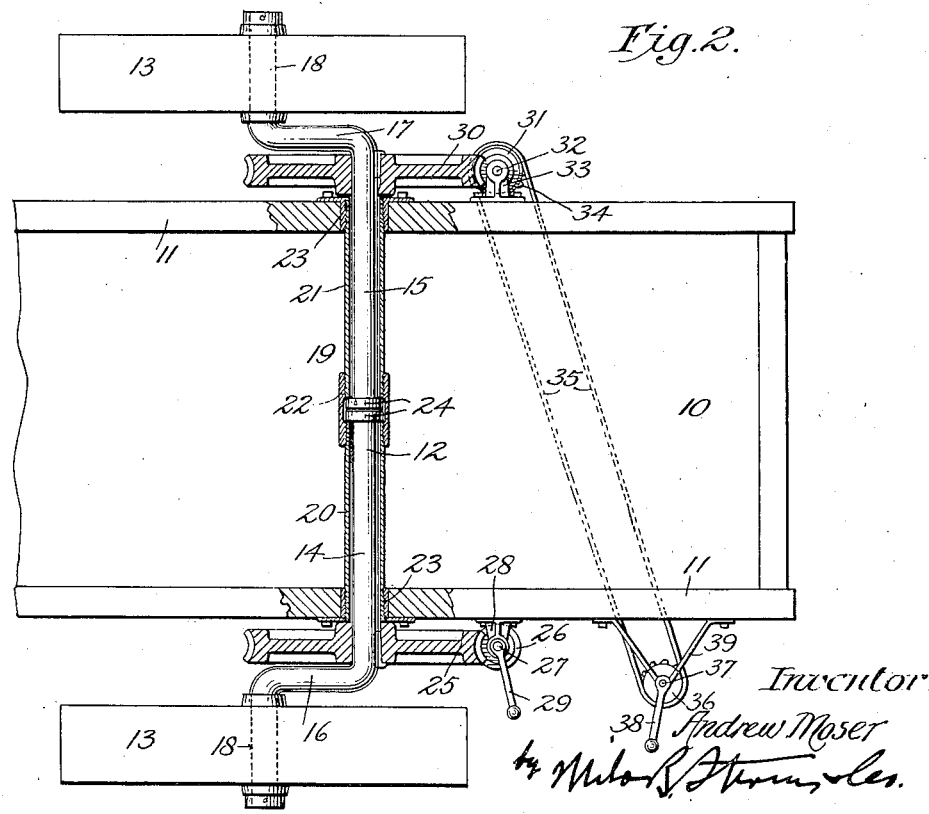

Figure 1 is a side elevation of a portion of a machine, such as a separator, with the leveling device applied thereto, and Fig. 2 is a plan view partly broken away.

Referring specifically to the drawings, the body 10 of the machine is here shown, for the sake of illustration, as having a longitudinal sill 11 on each side, upon which sills is journaled a rotatable axle 12 with a ground wheel 13 on each end. The axle extends transversely across the machine and is divided, substantially in its center, into two independently oscillating sections 14, 15, on the outer ends of which sections, exterior to the sills 11, are formed cranks 16 and 17, respectively. The terminal ends 18 of the cranks form bearings for the ground wheels 13.

Lying crosswise of the machine between the sills 11 is a sleeve 19 that affords a support and bearing for the sections 14 and 15 of the axle, said sleeve being formed of two lengths of pipe 20 and 21 connected by a coupling 22 screwed on the inner ends of the sleeve sections. The outer ends of the sleeve sections 20 and 21 are screwed into the sills direct, or into collars 23 bolted to the sills in the manner shown, or on the sides or bottoms thereof. The inner ends of the axle sections 14 and 15 project through the sleeve sections 20 and 21 into the coupling 22, and to each axle section is secured a collar 24, which collars bearing against each other and the inner ends of the respective sleeve sections 20 and 21, prevent longitudinal movement of the axle sections without interfering with their independent rotary movement in the sleeve 19.

Keyed on the axle section 14, between the crank 16 and the adjacent sill 11, is a worm wheel 25 with which a worm 26 engages for turning the worm wheel and its attached axle section 14. The worm 26 at the rear of the worm wheel is fixed on a vertical shaft 27 rotatable in bearings on a bracket 28 bolted to the sill 11. A crank 29, which may be on either end of the shaft 27, provides means for turning the worm.

A worm wheel 30, similar to the worm wheel 25 and similarly secured on the axle section 15, is in engagement with a worm 31 on a vertical shaft 32 mounted in a bearing bracket 33 secured to the adjacent sill 11. Also fixed on the lower end of the shaft 32 is a sprocket wheel 34 around which passes a sprocket chain 35 that extends across the machine beneath the body 10 thereof and is driven by a sprocket wheel 36 on a vertical shaft 37 provided with a hand crank 38 and mounted in bearing brackets 39 in rear of the worm 26. The worms 26 and 31 while shown and described as disposed at the rear of their respective worm wheels, may, if desired, be placed above or in any other position relative thereto that is found most convenient.

While being drawn over the ground, the divided axle 12 is preferably placed so that the cranks 16 and 17 thereon lie substantially in a horizontal position with their terminal ends 18 carrying the ground wheels placed forward of the center of rotation of the axle. See Fig. 1. Upon reaching its destination, if the ground upon which the machine is to operate be found irregular and the machine is not level, but is higher on one side, one of the cranks 29 and 38 is turned in such direction as to operate the axle section geared thereto that the lower side of the machine will be raised or the higher side lowered as in the judgment of the person in charge finds most expedient. If the inclination be slight, it may be necessary to raise or lower one side only, but if a great inclination is to be corrected, the two sections 14 and 15 of the axle will have to be turned thereby raising one side of the machine and lowering the other.

By this means any lateral tilting or unevenness is quickly corrected, and it is evident that any longitudinal inclination may be overcome by a proper manipulation of the hand cranks 29 and 38, to rock the axle sections 14 and 15 simultaneously in the same or opposite directions, or one at a time until the machine is brought to the proper level.

I claim:—

1. In a leveling device for a wheeled apparatus, a transverse axle formed in two independent sections, a crank on the outer end of each section for carrying a ground wheel, and means on the apparatus for independently rotating each axle section.

2. In a leveling device for a wheeled apparatus, a transverse axle formed of two alined and separate sections, a crank on the outer end of each section for carrying a ground wheel, self-locking gearing for independently rotating each axle section in either direction, and independent means for operating the gearing.

3. In a leveling device for a wheeled apparatus, a transverse axle formed of two alined and separate sections, a crank on the outer end of each section for carrying a ground wheel, worm gearing for independently rotating each axle section, and separate operating means on the apparatus for actuating the worm gearing.

4. In a leveling device for a wheeled apparatus, the combination with a transverse axle formed of two alined and separate sections each having a crank on its outer end for a ground wheel, a sleeve extending across the apparatus forming a bearing for the axle sections, means on the inner ends of said axle sections to hold the same against endwise movement, worm gearing for operating each axle section, and means on the apparatus for independently actuating said gearing.

5. In a leveling device for a wheeled apparatus, the combination with a transverse axle formed of two alined and separate sections each having a crank on its outer end for a ground wheel, and a collar on its inner end, a sleeve extending across the apparatus and fixed thereto to form a bearing for the axle sections, an enlargement on the sleeve for containing the collars on the adjacent ends of the axle sections and holding said sections from endwise movement, a worm gear wheel on each axle section, a worm in engagement with each worm gear, and means for operating each worm gearing to independently rotate the axle section connected thereto.

In testimony whereof I affix my signature.

ANDREW MOSER.